US012216700B2

(12) United States Patent
Taboriskiy et al.

(10) Patent No.: US 12,216,700 B2
(45) Date of Patent: *Feb. 4, 2025

(54) METHODS, SYSTEMS, AND MEDIA FOR PROCESSING QUERIES RELATING TO PRESENTED MEDIA CONTENT

(71) Applicant: Google LLC, Mountain View, CA (US)

(72) Inventors: Alexander Taboriskiy, Zurich (CH); Emmanuel Mogenet, Zollikerberg (CH); Oliver Heckmann, Baech (CH); Matsvei Zhdanovich, Zurich (CH); Gokhan Hasan Bakir, Zurich (CH); Behshad Behzadi, Zurich (CH); Karoly Csalogany, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/234,084

(22) Filed: Apr. 19, 2021

(65) Prior Publication Data

US 2021/0240756 A1 Aug. 5, 2021

Related U.S. Application Data

(63) Continuation of application No. 16/272,469, filed on Feb. 11, 2019, now Pat. No. 10,984,038, which is a
(Continued)

(51) Int. Cl.
*G06F 16/438* (2019.01)
*G06F 16/432* (2019.01)
(Continued)

(52) U.S. Cl.
CPC .......... *G06F 16/438* (2019.01); *G06F 16/433* (2019.01); *G06F 16/48* (2019.01); *H04N 21/42203* (2013.01); *H04N 21/4722* (2013.01)

(58) Field of Classification Search
CPC ...... G06F 16/433; G06F 16/438; G06F 16/48; H04N 21/42203; H04N 21/4722
See application file for complete search history.

(56) References Cited

U.S. PATENT DOCUMENTS 6,901,366 B1 5/2005 Kuhn et al.
8,484,017 B1 * 7/2013 Sharifi .................... G10L 19/00
704/226
(Continued)

FOREIGN PATENT DOCUMENTS

CN 1518710 8/2004
CN 1804829 7/2006
(Continued)

OTHER PUBLICATIONS

Decision to Refuse a European Patent Application dated Jan. 14, 2019 in EP Patent Application No. 14830459.5.
(Continued)

*Primary Examiner* — An Son P Huynh
(74) *Attorney, Agent, or Firm* — Brake Hughes Bellermann LLP

(57) ABSTRACT

Methods, systems, and media for processing queries relating to presented media content are provided. In some implementations, a method comprises: receiving a request to associate with a media playback device that is presenting media content to a user of the mobile device, wherein a mobile application executing on the mobile device and a media application executing on the media playback device exchange media playback information; activating a microphone associated with the mobile device to receive ambient sounds in response to associating with the media playback device; converting the received ambient sounds to one or more text inputs; determining whether the text inputs include a trigger term that corresponds to a request to initiate a query relating to the presented media content and the
(Continued)

query; in response to determining that the trigger term has been included in the text inputs, determining the media playback information from the media application that includes timing information corresponding to when during the presentation of the media content the query was received and media content identification information; causing a search to be performed that includes the query, the timing information, and the media content identification information; obtaining a search result that is responsive to the query; and presenting at least a portion of the search result to the query on a mobile display associated with the mobile device.

21 Claims, 7 Drawing Sheets

Related U.S. Application Data continuation of application No. 14/686,428, filed on Apr. 14, 2015, now Pat. No. 10,204,104.

(51) Int. Cl.
  *G06F 16/48* (2019.01)
  *H04N 21/422* (2011.01)
  *H04N 21/4722* (2011.01)

(56) References Cited

U.S. PATENT DOCUMENTS

| | | | |
|---|---|---|---|
| 8,694,533 | B2 | 4/2014 | Oztaskent et al. |
| 10,002,191 | B2* | 6/2018 | Trollope ............ G06F 16/7834 |
| 11,558,672 | B1* | 1/2023 | Clasen ............... H04N 21/4122 |
| 2002/0059258 | A1* | 5/2002 | Kirkpatrick .......... G06F 16/951 |
| 2005/0028208 | A1* | 2/2005 | Ellis ................... H04N 21/4755 |
| | | | 348/E7.071 |
| 2005/0204147 | A1* | 9/2005 | Yamasaki .............. G06F 21/31 |
| | | | 713/183 |
| 2008/0226119 | A1 | 9/2008 | Candelore et al. |
| 2008/0270110 | A1* | 10/2008 | Yurick .................... G06F 16/61 |
| | | | 704/3 |
| 2009/0112592 | A1 | 4/2009 | Candelore |
| 2011/0247042 | A1 | 10/2011 | Mallinson |
| 2011/0282906 | A1* | 11/2011 | Wong .................. G06F 16/7837 |
| | | | 707/E17.03 |
| 2011/0289098 | A1 | 11/2011 | Oztaskent et al. |
| 2011/0313775 | A1 | 12/2011 | Laligand et al. |
| 2012/0064948 | A1* | 3/2012 | Lee ....................... H04W 88/02 |
| | | | 455/566 |
| 2012/0078889 | A1 | 3/2012 | Chu-Carroll et al. |
| 2012/0240144 | A1 | 9/2012 | Rose |
| 2012/0291072 | A1 | 11/2012 | Maddison et al. |
| 2012/0324054 | A1 | 12/2012 | Gibbon et al. |
| 2013/0036442 | A1* | 2/2013 | Wingert ........... H04N 21/42209 |
| | | | 725/60 |
| 2013/0047178 | A1* | 2/2013 | Moon ................ H04N 21/4722 |
| | | | 725/31 |
| 2013/0086105 | A1 | 4/2013 | Hammontree et al. |
| 2013/0104172 | A1 | 4/2013 | Lee et al. |
| 2013/0139209 | A1 | 6/2013 | Urrabazo et al. |
| 2014/0068692 | A1* | 3/2014 | Archibong ......... H04N 21/6334 |
| | | | 725/116 |
| 2014/0089423 | A1* | 3/2014 | Jackels .............. H04N 21/8133 |
| | | | 709/206 |
| 2014/0250116 | A1 | 9/2014 | Hsu et al. |
| 2014/0253472 | A1* | 9/2014 | Ayoub ................. G06F 3/04883 |
| | | | 345/173 |
| 2014/0282660 | A1* | 9/2014 | Oztaskent .......... H04N 21/4725 |
| | | | 725/38 |
| 2014/0380362 | A1 | 12/2014 | Kert et al. |
| 2015/0382047 | A1* | 12/2015 | Van Os .............. H04N 21/4316 |
| | | | 725/38 |

FOREIGN PATENT DOCUMENTS

| | | |
|---|---|---|
| CN | 101566990 | 10/2009 |
| CN | 102792664 | 11/2012 |
| CN | 103365959 | 10/2013 |
| CN | 103501453 | 1/2014 |
| EP | 2388721 | 11/2011 |
| EP | 2501144 | 9/2012 |
| JP | 2001169269 | 6/2001 |
| JP | 2005092295 | 4/2005 |
| JP | 2011517816 | 8/2011 |
| JP | 2011243204 | 12/2011 |
| JP | 2012118918 | 6/2012 |
| JP | 2012161030 A | 8/2012 |
| JP | 2011035628 | 7/2013 |
| JP | 2013529325 | 7/2013 |
| WO | WO 2002077864 | 10/2002 |
| WO | WO 2009124002 | 10/2009 |
| WO | WO 2011123718 | 10/2011 |
| WO | WO 2013040533 | 3/2013 |
| WO | 2014199357 A1 | 12/2014 |
| WO | WO 2015015779 | 2/2015 |

OTHER PUBLICATIONS

Examination Report dated Jan. 19, 2018 in EP Patent Application No. 14830459.5.
Examination Report dated Jan. 29, 2019 in GB Patent Application No. 1715306.5.
Examination Report dated May 17, 2019 in EP Patent Application No. 16718169.2.
Examination Report dated Nov. 10, 2017 in GB Patent Application No. 1715306.5.
International Search Report and Written Opinion of the International Search Authority dated Apr. 17, 2015 in International Patent Application No. PCT/US2014/072258.
International Search Report and Written Opinion of the International Search Authority dated Jul. 28, 2016 in International Patent Application No. PCT/US2016/027523.
Notice of Allowance dated Jan. 1, 2021 in U.S. Appl. No. 16/011,053.
Notice of Allowance dated Jan. 24, 2018 in U.S. Appl. No. 14/191,034.
Notice of Allowance dated Jan. 28, 2020 in JP Patent Application No. 2016-543706.
Notice of Allowance dated Apr. 8, 2020 in U.S. Appl. No. 16/011,053.
Notice of Allowance dated Oct. 1, 2018 in U.S. Appl. No. 14/686,428.
Notice of Allowance dated Dec. 10, 2020 in U.S. Appl. No. 16/272,469.
Office Action dated Jan. 5, 2016 in U.S. Appl. No. 14/191,034.
Office Action dated Jan. 14, 2020 in U.S. Appl. No. 16/011,053.
Office Action dated Jan. 19, 2021 in CA Patent Application No. 2,935,568.
Office Action dated Jan. 23, 2019 in CN Patent Application No. 201480071926.8.
Office Action dated Jan. 31, 2020 in U.S. Appl. No. 16/272,469.
Office Action dated May 15, 2019 in AU Patent Application No. 2014374036.
Office Action dated Jun. 2, 2017 in U.S. Appl. No. 14/191,034.
Office Action dated Jun. 4, 2019 in JP Patent Application No. 2016-543706.
Office Action dated Jun. 28, 2017 in U.S. Appl. No. 14/686,428.
Office Action dated Jul. 10, 2020 in U.S. Appl. No. 16/272,469.
Office Action dated Jul. 14, 2016 in U.S. Appl. No. 14/191,034.
Office Action dated Jul. 22, 2019 in CN Patent Application No. 201480071926.8.
Office Action dated Jul. 24, 2020 in U.S. Appl. No. 16/011,053.
Office Action dated Jul. 29, 2014 in U.S. Appl. No. 13/826,910.
Office Action dated Aug. 7, 2017 in U.S. Appl. No. 61/922,218.
Office Action dated Aug. 20, 2019 in U.S. Appl. No. 16/272,469.
Office Action dated Sep. 5, 2018 in JP Patent Application No. 2016-543706.
Office Action dated Sep. 6, 2017 in U.S. Appl. No. 14/191,034.
Office Action dated Sep. 20, 2019 in U.S. Appl. No. 16/011,053.
Office Action dated Oct. 20, 2016 in U.S. Appl. No. 14/191,034.
Office Action dated Dec. 8, 2017 in U.S. Appl. No. 14/686,428.

(56) References Cited

OTHER PUBLICATIONS

Office Action dated Dec. 28, 2020 in KR Patent Application No. 10-2016-7018931.
Summons to Attend Oral Proceedings dated Jul. 12, 2018 in EP Patent Application No. 14830459.5.
Office Action dated Apr. 6, 2021 in CN Patent Application No. 201680018231.2.
Office Action dated Sep. 15, 2022 in U.S. Appl. No. 17/306,169.
Office Action dated Oct. 20, 2021 in CN Patent Application No. 20168001231.2.

* cited by examiner

METHODS, SYSTEMS, AND MEDIA FOR PROCESSING QUERIES RELATING TO PRESENTED MEDIA CONTENT

CROSS-REFERENCE TO RELATED APPLICATIONS

This application is a continuation of U.S. patent application Ser. No. 16/272,469, filed Feb. 11, 2019, which is a continuation of U.S. patent application Ser. No. 14/686,428, filed Apr. 14, 2015, each of which is hereby incorporated by reference herein in its entirety.

TECHNICAL FIELD

The disclosed subject matter relates to methods, systems, and media for processing queries relating to presented media content.

BACKGROUND

While watching a television program, a viewer is often interested in information relating to the television program. For example, the viewer may want to search for additional information about an actor seen in a movie or about locations that are shown in a documentary.

Search engines allow the viewer to search on the Internet for resources, which may include webpages, images, video content, and audio content. A typical search engine provides a web page for entering search terms, where the search terms are inputted by the viewer. Search results responsive to particular search terms are provided to the viewer. Moreover, with the advent of mobile devices, the use of mobile search engines has increased. For example, using a mobile device, the viewer may perform a search and browse through Internet content while watching the television program.

In an example where the user wants to learn the name of a particular actor in a movie and obtain additional information about the particular actor, the user may attempt to obtain this information by finding the name of the movie (e.g., from a program guide, from an online television guidance website, from a printed guide, etc.) and searching for the movie by inputting it into a mobile search engine. The user then clicks through search results to find a webpage containing information relating to the movie (e.g., an online website containing information relating to movies and television programs), accesses the webpage, and searches through the webpage to find information relating to the particular actor. If the user is able to find the actor on the webpage, the user accesses another page on the website relating to the particular actor and scans through this page to find the desired information about the particular actor. This is a time consuming procedure for the user. Moreover, this may cause the user to miss a substantial portion of the television program or to pause the television program to obtain such information via this procedure.

Accordingly, it is desirable to provide new methods, systems, and media for processing queries relating to presented media content.

SUMMARY

In accordance with some implementations of the disclosed subject matter, methods, systems, and media for processing queries relating to presented media content are provided.

In some implementations, a method for providing media guidance is provided, the method comprising: receiving, from a mobile device, a request to associate with a media playback device that is presenting media content to a user of the mobile device, wherein a mobile application executing on the mobile device and a media application executing on the media playback device exchange media playback information; activating a microphone associated with the mobile device to receive ambient sounds in response to associating with the media playback device; converting the received ambient sounds to one or more text inputs; determining whether the text inputs include a trigger term that corresponds to a request to initiate a query relating to the presented media content and the query; in response to determining that the trigger term has been included in the text inputs, determining the media playback information from the media application that includes timing information corresponding to when during the presentation of the media content the query was received and media content identification information; causing a search to be performed that includes the query, the timing information, and the media content identification information; obtaining a search result that is responsive to the query; and presenting at least a portion of the search result to the query on a mobile display associated with the mobile device.

In some implementations, a system for providing media guidance is provided, the system comprising a hardware processor that is configured to: receive a request to associate with a media playback device that is presenting media content to a user of a mobile device, wherein a mobile application executing on the mobile device and a media application executing on the media playback device exchange media playback information; activate a microphone associated with the mobile device to receive ambient sounds in response to associating with the media playback device; convert the received ambient sounds to one or more text inputs; determine whether the text inputs include a trigger term that corresponds to a request to initiate a query relating to the presented media content and the query; in response to determining that the trigger term has been included in the text inputs, determine the media playback information from the media application that includes timing information corresponding to when during the presentation of the media content the query was received and media content identification information; cause a search to be performed that includes the query, the timing information, and the media content identification information; obtain a search result that is responsive to the query; and present at least a portion of the search result to the query on a mobile display associated with the mobile device.

In some implementations, a non-transitory computer-readable medium containing computer executable instructions that, when executed by a processor, cause the processor to perform method for providing media guidance is provided. The method comprises: receiving a request to associate with a media playback device that is presenting media content to a user of the mobile device, wherein a mobile application executing on the mobile device and a media application executing on the media playback device exchange media playback information; activating a microphone associated with the mobile device to receive ambient sounds in response to associating with the media playback device; converting the received ambient sounds to one or more text inputs; determining whether the text inputs include a trigger term that corresponds to a request to initiate a query relating to the presented media content and the query; in response to determining that the trigger term has been included in the text inputs, determining the media playback information from the media application that includes timing information corresponding to when during the presentation of the media content the query was received and media content identification information; causing a search to be performed that includes the query, the timing information, and the media content identification information; obtaining a search result that is responsive to the query; and presenting at least a portion of the search result to the query on a mobile display associated with the mobile device.

In some implementations, a system for providing media guidance is provided, the system comprising: means for receiving a request to associate with a media playback device that is presenting media content to a user of the mobile device, wherein a mobile application executing on the mobile device and a media application executing on the media playback device exchange media playback information; means for activating a microphone associated with the mobile device to receive ambient sounds in response to associating with the media playback device; means for converting the received ambient sounds to one or more text inputs; means for determining whether the text inputs include a trigger term that corresponds to a request to initiate a query relating to the presented media content and the query; in response to determining that the trigger term has been included in the text inputs, means for determining the media playback information from the media application that includes timing information corresponding to when during the presentation of the media content the query was received and media content identification information; means for causing a search to be performed that includes the query, the timing information, and the media content identification information; means for obtaining a search result that is responsive to the query; and means for presenting at least a portion of the search result to the query on a mobile display associated with the mobile device.

In some implementations, the system further comprises: means for determining whether the microphone associated with the mobile device is capable of receiving the ambient sounds; and means for activating an audio capturing device associated with the media playback device in response to determining that the microphone associated with the mobile device is not capable of receiving the ambient sounds.

In some implementations, the system further comprises means for processing the ambient sounds using a speech recognition system.

In some implementations, the system further comprises: means for requesting additional media playback information from the media application executing on the media playback device; and means for transmitting the query, the media playback information, and the additional media playback information to a search system to receive the search result.

In some implementations, the system further comprises means for determining whether the search result is to be presented on the mobile display associated with the mobile device; and means for presenting the search result on a display associated with the media playback device in response to determining that the search result is not to be presented on the mobile display associated with the mobile device. In some implementations, the search result is determined to be presented on the mobile device based on search popularity information associated with the search result.

In some implementations, the system further comprises: means for retrieving media playback information prior to receiving the query; and means for associating the media playback information with the query in response to receiving the trigger term.

In some implementations, the system further comprises: means for receiving requests from a plurality of mobile devices to associate with the media playback device that is presenting the media content; means for activating audio capturing devices associated with at least a portion of the plurality of mobile devices and the media playback device to receive ambient sounds from users proximate to the plurality of mobile devices and the media playback device; means for determining that a plurality of queries have been received based on the received ambient sounds, wherein each of the plurality of queries includes the trigger term and the query relating to the presented media content; means for obtaining a plurality of search results, wherein each of the plurality of search results is responsive to one of the plurality of queries; and means for causing the plurality of search results to be presented.

In some implementations, the system further comprises: means for associating a search result of the plurality of search results with the respective mobile device from which the ambient sounds including the query was received; and means for causing the at least a portion of the search result to be presented on the respective mobile device.

In some implementations, the system further comprises means for causing each of the plurality of search results to be presented on a display associated with the media playback device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
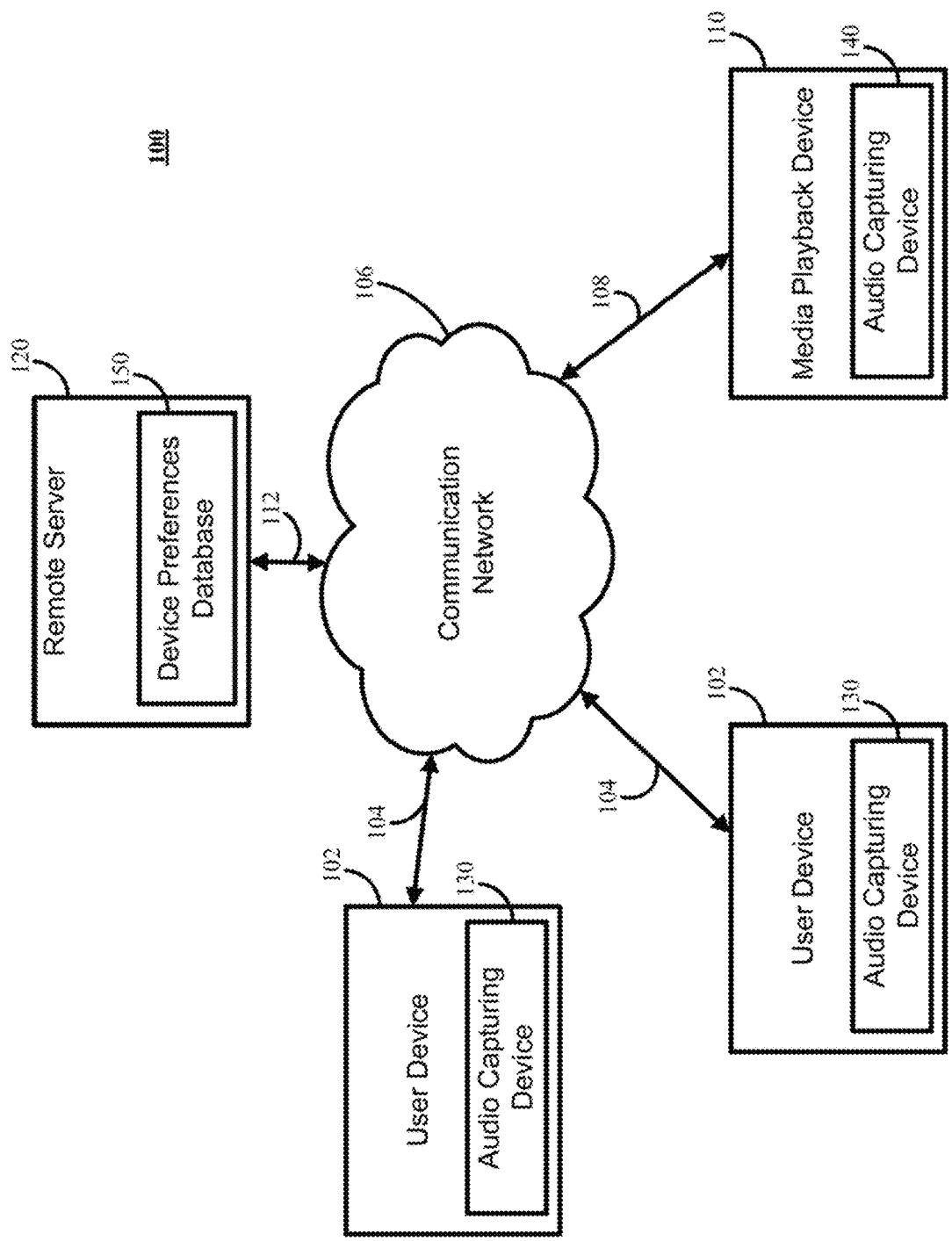
FIG. 1 shows a schematic diagram of an illustrative system suitable for implementation of mechanisms described herein for processing queries relating to presented media content in accordance with some implementations of the disclosed subject matter.

In accordance with some implementations of the disclosed subject matter, mechanisms (which can include methods, systems and media) for processing queries relating to presented media content are provided.

In some implementations, these mechanisms can associate a mobile device with a media playback device that is presenting media content and, in response to detecting a query relating to the media content being presented by the media playback device, present an answer responsive to the search query. For example, a microphone or any other suitable audio capturing device can be activated on the mobile device and, in response to capturing a voice input that includes a search initiation keyword followed by a search query, the search query and media playback information (e.g., a media content identifier, a timestamp of when the search query was received during the playback of the media content, etc.) can be transmitted to a search server. In another example, information associated with the mobile device (e.g., location information, media identification information, etc.) can also be transmitted to the search server. The response from the search server can be used to present an answer that is responsive to the search query on the mobile device. For example, the answer can be presented in the form of a notification on the display of the mobile device. In another example, additionally or alternatively to presenting a mobile device notification, the answer can be presented in the form of a notification on the display of the media playback device that is presenting the media content.

In some implementations, the mechanisms can be implemented with multiple mobile devices that are associated with a media playback device. For example, when multiple mobile devices are present on a network that is common to the media playback device, the mechanisms can activate multiple microphones on different devices for receiving search queries. In this example, the mechanisms can present an answer responsive to the received search query to the device having the microphone that received the search query. Additionally or alternatively, the mechanisms can determine which device is suited to present the answer, such as on a display of the mobile device that received the search request, on a display of the mobile device closest in proximity to the user that uttered the search query, on displays of multiple mobile devices that are within a particular range of the mobile device that received the search request, and/or on a display of the media playback device so that users viewing the media content can review the answer to the search query.

In some implementations, upon detecting the presence of multiple audio capturing devices, the mechanisms can determine which audio capturing device to activate for receiving ambient sounds and detecting whether a search query has been received. For example, based on audio capturing capabilities, the mechanisms can determine whether to activate a microphone associated with the media playback device, a microphone of a first mobile device that is associated with the media playback device, a microphone associated with a second mobile device that is also associated with the media playback device, or any suitable combination thereof. In some implementations, upon detecting the presence of multiple audio capturing devices, the mechanisms can access preference information of each device associated with an audio capturing device and determine whether the device provides affirmative authorization to detect search queries using the audio capturing device.

These and other features are further described in connection with FIGS. 1-7.

FIG. 1 shows an example 100 of a generalized schematic diagram of a system on which the mechanisms for processing queries relating to presented media content as described herein can be implemented in accordance with some implementations. As illustrated, system 100 can include one or more user devices 102. User devices 102 can be local to each other or remote from each other. User devices 102 can be connected by one or more communications links 104 to a communication network 106 that can be linked to a server 120 via a communications link 112.

System 100 can include one or more media playback devices 110. Media playback devices 110 can be local to each other or remote from each other. Media playback devices 110 can be connected by one or more communications links 108 to communication network 106 that can be linked to server 120 via communications link 112 and/or user devices 102 via communications link 104.

System 100 can include one or more servers 120. Server 120 can be any suitable server or servers for providing access to the mechanisms described herein for processing queries relating to presented media content, such as a processor, a computer, a data processing device, or any suitable combination of such devices. For example, the mechanisms for associating multiple devices with a media playback device can be distributed into multiple backend components and multiple frontend components and/or user interfaces. In a more particular example, backend components, such as mechanisms for receiving requests to associate mobile devices and/or mobile device accounts with a media playback device, requests identifying mobile devices on a common network with a particular media playback device, requests to present media content, etc., can be performed on one or more servers 120. In another particular example, frontend components, such as presentation of media content, presentation of answers to search queries, requesting media content to be presented, identifying user devices that are present, causing a user device to be associated with a media playback device, etc., can be performed on one or more user devices 102 and/or media playback device 110.

In some implementations, each of user devices 102, media playback device 110 and server 120 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 102 can be implemented as a smartphone, a tablet computer, a wearable computer, a laptop computer, a portable game console, any other suitable computing device, or any suitable combination thereof. As another example, media playback device 110 can be implemented as a digital media receiver, a media streaming device, a game console, a set-top box, a television, a projector, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 104, 108, and 112 can be any communications links suitable for communicating data among user devices 102, media playback device 110 and server 120, such as network links, dial-up links, wireless links, hard-wired links, any other suitable communications links, or any suitable combination of such links. Note that, in some implementations, multiple servers 120 can be used to provide access to different mechanisms associated with the mechanisms described herein for processing queries relating to presented media content. For example, system 100 can include a user preferences server 120 that stores user preferences associated with one or more users and/or one or more user devices 102, a user preferences database server 120 that maintains one or more databases of correspondence between users and/or user devices 102 with which a particular media playback device 110 is associated, and a content delivery server 120 that determines which content to cause to be presented by the particular media playback device 110 based on the user preferences of users and/or user devices 102 associated with media playback device 110, and/or any other suitable servers for performing any suitable functions of the mechanisms described herein.

In some implementations, user device 102 can be associated with audio capturing device 130. Audio capturing device 130 can be any suitable audio input device for receiving audio data, such as ambient sounds, voice commands, etc. Illustrative examples of audio capturing device 130 include a microphone coupled to user device 102. For example, in some implementations, audio capturing device 130 can be integrated with or connected to user device 102. In another example, in some implementations, audio capturing device 130 can include an external microphone (e.g., a microphone in an accessory such as a wired or wireless headset).

In some implementations, media playback device 110 can be associated with audio capturing device 140. Audio capturing device 140 can be any suitable audio input device for receiving audio data, such as ambient sounds, voice commands, etc. Illustrative examples of audio capturing device 140 include a microphone coupled to media playback device 110. For example, in some implementations, audio capturing device 140 can be integrated with or connected to media playback device 110. In another example, in some implementations, audio capturing device 140 can include an external microphone.

In some implementations, media playback device 110 can be associated with device identifying information. Device identifying information can identify a user of media playback device 110 and/or can identify media playback device 110. For example, in some implementations, device identifying information can be a token or other data associated with a user of media playback device 110. For example, the token or other data can identify a user associated with a particular user account of a product and/or service. In a more particular example, such a token or other information can include a string of characters (which can be, for example, randomly assigned) that is associated with a particular email address that was used as a credential to log in to an application on the media playback device. As another example, device identifying information can be identifying information of media playback device 110, such as a MAC address, a device ID, a serial number, and/or any other suitable identifying information of media playback device 110. As yet another example, device identifying information can be a combination of identifying information of a user and identifying information of media playback device 110. In some implementations, device identifying information can include semantically meaningful identifying information, such as a user assigned name (e.g., "Alex's Living Room Streaming Device").

In some implementations, device identifying information can include a persistent identifier for media playback device 110 that can be assigned based on any suitable conditions. For example, a device ID of presentation device 110 can be assigned when media playback device 110 is initialized and/or reinitialized. In a more particular example, during initialization, media playback device 110 can contact a server to request a persistent device ID. In some implementations, this device ID can be assigned by the server such that each media playback device has a unique device ID. Additionally, media playback device 110 can receive a different device ID upon media playback device 110 being reset or otherwise reinitialized. In some implementations, such a device ID can be used to associate user preferences and/or any other suitable information (e.g., at a server) with media playback device 110 for later use in determining content to be presented using media playback device 110.

In some implementations, server 120 can store a device preferences database 150. Device preferences database 150 can include preferences associated with a user of a particular user device 102. For example, such preferences can include whether a user of a particular user device 102 has provided affirmative authorization to access an associated audio capturing device (e.g., turning a microphone on and off). Additionally or alternatively, in some implementations, device preferences database 150 can include information identifying which users are associated with which audio capturing device. In some implementations, information in device preferences database 150 can be organized using any suitable technique or combination of techniques. For example, device preferences database 150 can be organized as a relational database.

Figure 2:
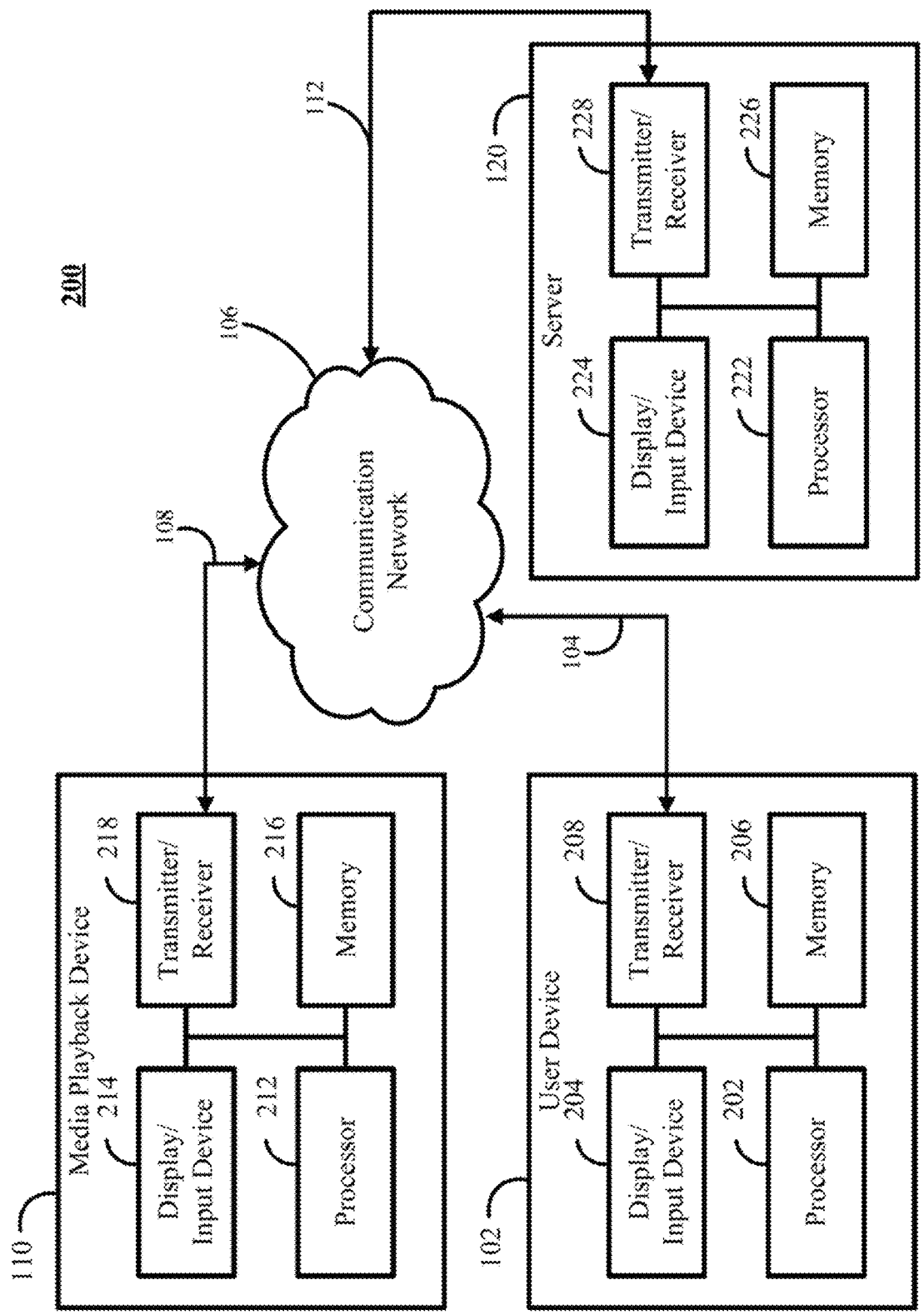
FIG. 2 shows a detailed example of hardware that can be used in a server, a media playback device, and/or a user device of FIG. 1 in accordance with some implementations of the disclosed subject matter.

FIG. 2 illustrates an example 200 of hardware that can be used to implement one or more of user devices 102, media playback device 110, and servers 120 depicted in FIG. 1 in accordance with some implementations of the disclosed subject matter. Referring to FIG. 2, user device 102 can include a hardware processor 202, a display/input device 204, memory 206 and a transmitter/receiver 208, which can be interconnected. In some implementations, memory 206 can include a storage device (such as a computer-readable medium) for storing a user device program for controlling hardware processor 202.

Hardware processor 202 can use the computer program to execute and/or interact with the mechanisms described herein for presenting content based on user preferences of multiple users in the presence of a media presentation device, controlling presentation of the content on the presentation device, disassociating user preferences from the presentation device, setting user preferences, etc. In some implementations, the user device program can cause hardware processor 202 to, for example, interact with a media playback device and/or a device executing at least a portion of process 300 as described below in connection with FIG. 3. In some implementations, hardware processor 202 can send and receive data through communications link 104 or any other communication links using, for example, a transmitter, a receiver, a transmitter/receiver, a transceiver, or any other suitable communication device, such as transmitter/receiver 208. Display/input device 204 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 108 can include any suitable transmitter and/or receiver for transmitting and/or receiving, among other things, instructions for presenting content, instructions for setting user preferences, instructions for associating user preferences with a presentation device, etc., and can include any suitable hardware, firmware and/or software for interfacing with one or more communication networks, such as network 106 shown in FIG. 1. For example, transmitter/receiver 208 can include network interface card circuitry, wireless communication circuitry, and/or any other suitable type of communication network circuitry, one or more antennas, and/or any other suitable hardware, firmware and/or software for transmitting and/or receiving signals.

Media playback device 110 can include a hardware processor 212, a display/input device 214, memory 216 and a transmitter/receiver 218, which can be interconnected. In some implementations, memory 216 can include a storage device (such as a computer-readable medium) for storing a presentation device program for controlling hardware processor 212.

Hardware processor 212 can use the presentation device program to execute and/or interact with the mechanisms described herein for presenting content based on user preferences of multiple users in the presence of a media presentation device, requesting content to present based on user preferences of associated users, request and/or transmit presentation device identifying information 140, etc. In some implementations, the presentation device program can cause hardware processor 212 to, for example, interact with a device executing at least a portion of process 300 as described below in connection with FIG. 3. In some implementations, hardware processor 212 can send and receive data through communications link 108 or any other communication links using, for example, a transmitter, a receiver, a transmitter/receiver, a transceiver, or any other suitable communication device, such as transmitter/receiver 218. Display/input device 214 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 218 can include any suitable transmitter and/or receiver for transmitting and/or receiving, among other things, requests for content to be presented, content to be presented, signals to determine whether one or more user devices 102 are present, etc., and can include any suitable hardware, firmware and/or software for interfacing with one or more communication networks, such as network 106 shown in FIG. 2. For example, transmitter/receiver 218 can include network interface card circuitry, wireless communication circuitry, and/or any other suitable type of communication network circuitry, one or more antennas, and/or any other suitable hardware, firmware and/or software for transmitting and/or receiving signals.

Server 120 can include a hardware processor 222, a display/input device 224, memory 226 and a transmitter/receiver 228, which can be interconnected. In some implementations, memory 228 can include a storage device for storing data received through communications link 112 or through other links. The storage device can further include a server program for controlling hardware processor 222. In some implementations, memory 228 can include information stored as a result of user activity and/or activity by a media playback device (e.g., device identifying information, content to be presented, requests for content to be presented, query information, etc.). In some implementations, the server program can cause hardware processor 222 to, for example, execute at least a portion of process 300 as described below in connection with FIG. 3.

Hardware processor 222 can use the server program to communicate with user devices 102 and/or presentation device 110 as well as provide access to and/or copies of the mechanisms described herein. It should also be noted that data received through communications link 112 or any other communications links can be received from any suitable source. In some implementations, hardware processor 222 can send and receive data through communications link 112 or any other communication links using, for example, a transmitter, a receiver, a transmitter/receiver, a transceiver, or any other suitable communication device, such as transmitter/receiver 228. In some implementations, hardware processor 222 can receive commands and/or values transmitted by one or more user devices 102, media playback device 110, one or more other servers 120, and/or one or more users of server 120, such as a user that makes changes to adjust settings associated with the mechanisms described herein for associating multiple users with a media presentation device. Display 224 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 228 can include any suitable transmitter and/or receiver for transmitting and/or receiving, among other things, content to be presented, requests for content, search queries, etc., and can include any suitable hardware, firmware and/or software for interfacing with one or more communication networks, such as network 106 shown in FIG. 2. For example, transmitter/receiver 228 can include network interface card circuitry, wireless communication circuitry, and/or any other suitable type of communication network circuitry, one or more antennas, and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 102 and/or presentation device 110. Additionally or alternatively, as described above in connection with FIG. 1, multiple servers 120 can be implemented to perform different tasks associated with the mechanisms described herein.

Figure 3:
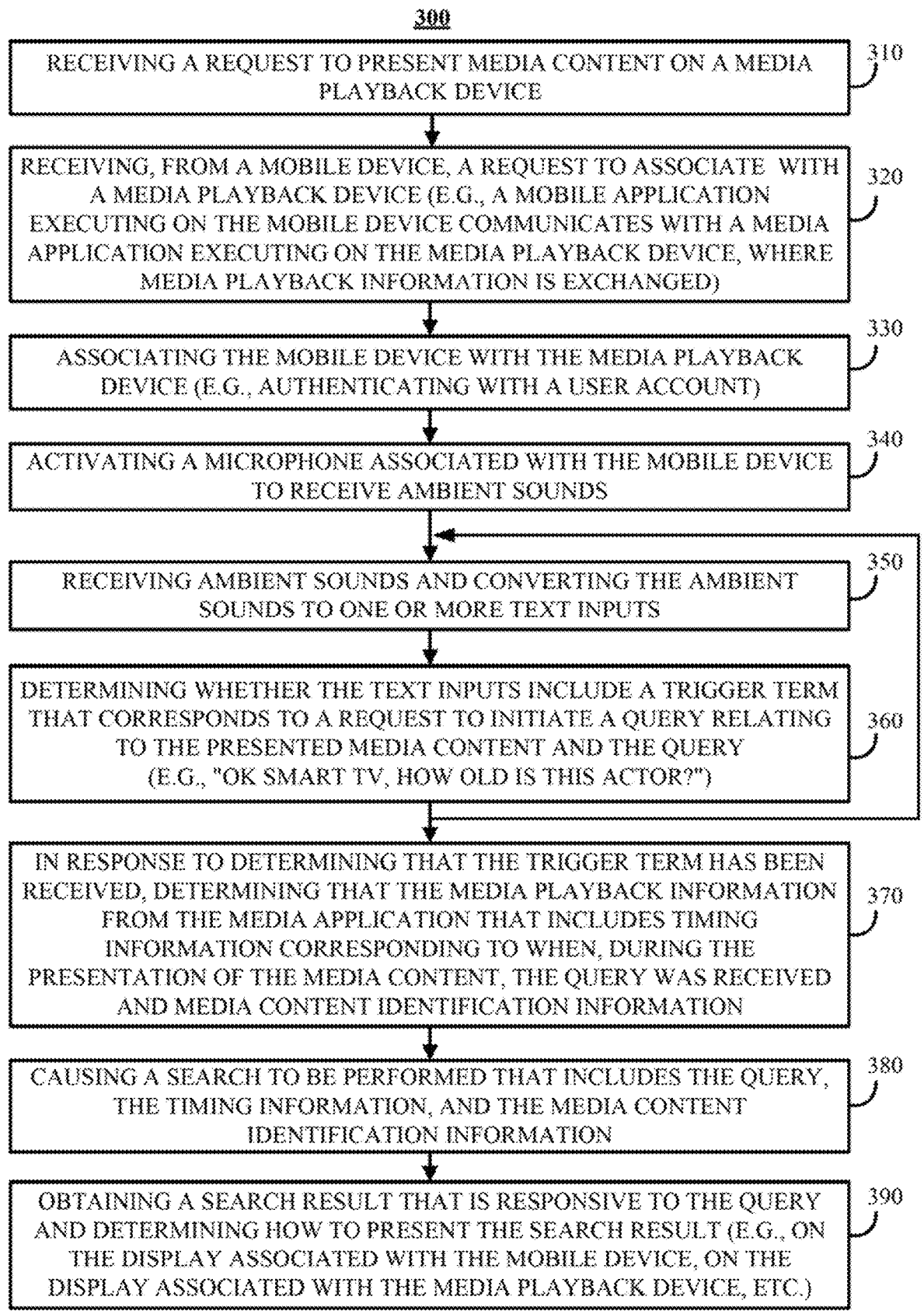
FIG. 3 shows an illustrative example of a process for processing queries relating to presented media content in accordance with some implementations of the disclosed subject matter.

FIG. 3 shows an example 300 of a process for processing queries relating to media content in the presence of a media playback device in accordance with some implementations of the disclosed subject matter. As shown in FIG. 3, process 300 can begin, at 310, by receiving a request to present media content. For example, a request to present media content on a media playback device can be received from a mobile device associated with or connected to the media playback device. It should be noted that the request can be received using any suitable technique or combination of techniques and can be received from any suitable source, such as the media playback device on which the media content is to be presented and/or a mobile device associated with the media playback device. For example, a request to stream a program from an on-demand content source and display the program on a media playback device can be received from a mobile device having an application, such as a remote control application, that allows the mobile device to control the media playback device. In another example, a media playback device can begin presenting media content from any suitable content source prior to the presence of users having mobile devices associating with the media playback device.

At 320, process 300 can receive, from a mobile device, a request to associate with a media playback device. For example, a mobile application executing on the mobile device can communicate with a media application executing on the media playback device, where commands and media playback information can be exchanged between the applications and where status information can be synchronized. Continuing the example in 310, the mobile application executing on the mobile device can be a remote control application that communicates with a media application executing on the media playback device. The remote control application can transmit commands from a user interface displayed on the mobile device to the media application executing on the media playback device.

At 330, one or more mobile devices can be associated with the media playback device. For example, multiple mobile devices 102 executing remote control applications or other suitable mobile applications can transmit requests for association to media playback device 110. In another example, multiple mobile devices 102 can transmit a signal or request to server 120 identifying itself as in the presence of media playback device 110. In a more particular example, a remote control application or other suitable application executing on mobile device 102 can present a user interface indicating that mobile device 102 has been associated with the media playback device (e.g., Alex's Living Room Streaming Device).

Additionally or alternatively, in some implementations, process 300 can receive identifying information of mobile devices as being present by the requesting device (e.g., the device from which the request for content is received at 310) and/or any other suitable device. In some implementations, any suitable technique or combination of techniques can be used to detect the presence of a particular mobile device. For example, media playback device 110 can detect mobile devices that are connected to a same local network as media playback device 110 (e.g., a LAN including a Wi-Fi network). As another example, media playback device 110 can broadcast and/or unicast one or more messages targeting nearby mobile devices 102 using any suitable communication techniques, such as peer-to-peer communication techniques. In a more particular example, media playback device 110 can use transmitter/receiver 218 to transmit one or more signals (e.g., using any suitable communication standard such as Bluetooth, wireless USB, etc.) to any nearby mobile devices 102 which can, in some cases, receive the signal using transmitter/receiver 208 and respond with a message indicating that the user device is present. In another more particular example, media playback 110 can use a speaker to emit a signal as sound waves, which can be outside the range of human hearing, to any nearby mobile devices 102 which can, in some cases, receive the signal using a microphone and respond with a message indicating that the mobile device is present.

At 340, in some implementations, a microphone or other suitable audio capturing device can be activated on a mobile device to receive ambient sounds in the environment of the media playback device (e.g., in a living room environment).

In some implementations where multiple devices each having a corresponding audio capturing device are associated with the media playback device, process 300 can determine which of the audio capturing devices to activate. For example, the microphones associated with each of the media playback devices can be positioned within the environment in which the media content is being presented to receive and/or record ambient sounds in the environment. Process 300 can determine particular microphones to activate based on user preferences, audio capabilities, the results of a transmitted audio capturing test, device history information indicating which devices have previously received queries relating to media content, etc. For example, an audio capturing test that requests the user speak into a microphone associated with a mobile device can be transmitted, where microphones that have greater signal strength are selected for activation. In another example, an audio capturing test that causes a speaker on one mobile device to transmit a sound that is detected by a microphone of another mobile device can be used to test the configuration or capabilities of the microphone. In yet another example, upon having multiple mobile devices that each have a microphone, process 300 can activate microphones on those mobile devices based on user-configured settings or preferences (e.g., an authorization to use the microphone for detecting trigger terms or search initiating keywords, query phrases, etc.).

It should be noted that, prior to activating an audio capturing device to receive ambient sounds or any other audio data, process 300 can provide the user with an opportunity to provide a consent or authorization to perform actions, such as activating an audio input device and transmitting audio data. For example, upon loading an application on a mobile device, such as a television device or a media playback device, the application can prompt the user to provide authorization for activating an audio input device, transmitting audio data, detecting events in the audio data, and/or rewinding media content based on the detected events. In a more particular example, in response to downloading the application and loading the application on a media playback device or a mobile device, the user can be prompted with a message that requests (or requires) that the user provide affirmative consent prior to performing these actions. Additionally or alternatively, in response to installing the application, the user can be prompted with a permission message that requests (or requires) that the user provide content prior to performing these detections and/or transmitting information relating to these detections.

Upon activating one or more audio capturing devices, process 300 can receive ambient sounds and convert the ambient sounds to one or more text inputs at 350. For example, in response to detecting ambient sounds in an environment with an audio capturing device, the audio signal can be transmitted to a speech recognition system that converts the detected ambient sounds into one or more text inputs.

In some implementations, process 300 can convert the ambient sounds into an audio signal (e.g., using the audio input device or a hardware processor). For example, the mobile device can temporarily store the audio data and/or the audio signal that includes one or more text inputs in a circular buffer (e.g., implemented in volatile memory that will be overwritten when new audio data or audio signals are received). In a more particular example, the circular buffer can be used to temporarily store audio data corresponding to a predetermined amount of audio data (e.g., thirty seconds, one minute, ten minutes, thirty minutes, etc.) and the oldest audio data can be continually overwritten with newly recorded audio data.

It should be noted that, in some implementations in which the media content is presented using one or more speakers, a component of the audio signal can correspond to the audio portion of the media content being presented. The component of the audio signal that corresponds to the media content being presented can, for example, be removed from the audio data such that the remaining audio data corresponds to the ambient sounds detected in the environment. In another example, the component of the audio signal that corresponds to the media content being presented can be extracted and used to determine the portion of the media content that a query has been received. In a more particular example, the component of the audio signal that corresponds to the media content being presented can be transmitted to a search server or a suitable fingerprint server, where the server compares the portion of the audio signal to content fingerprints to facilitate media content identification.

In response to converting ambient sounds to one or more text inputs, process 300 can determine whether the text inputs include a trigger term that corresponds to a request to initiate a query relating to the presented media content and a query phrase at 360. For example, in response to receiving the text inputs of "OK Smart TV, how old is this actor?," process 300 can determine whether one or more trigger terms have been received to initiate a query. In this example, the text input "OK Smart TV" can be determined to match one or more trigger terms stored on the mobile device for initiating a query relating to presented media content. In a more particular example, process 300 can ignore text inputs from ambient sounds until one or more trigger terms have been received.

It should be noted that multiple trigger terms can be used to initiate a query relating to presented media content. For example, a particular trigger term, such as "OK Smart TV" can be accepted to initiate the first query relating to presented media content and another trigger term, such as "OK" can be accepted to initiate subsequent queries. In another example, the media playback device and/or the mobile device can present a user interface that indicates the trigger term for initiating one or more queries relating to presented media content—e.g., "Say 'OK Smart TV' followed by your question to ask a question about this program"—and, in response to processing the first query and presenting an answer on a suitable device, the media playback device and/or the mobile device can present an updated user interface that indicates the trigger term for initiating a subsequent query—e.g., "Say 'OK' followed by your next question.

Figure 4:
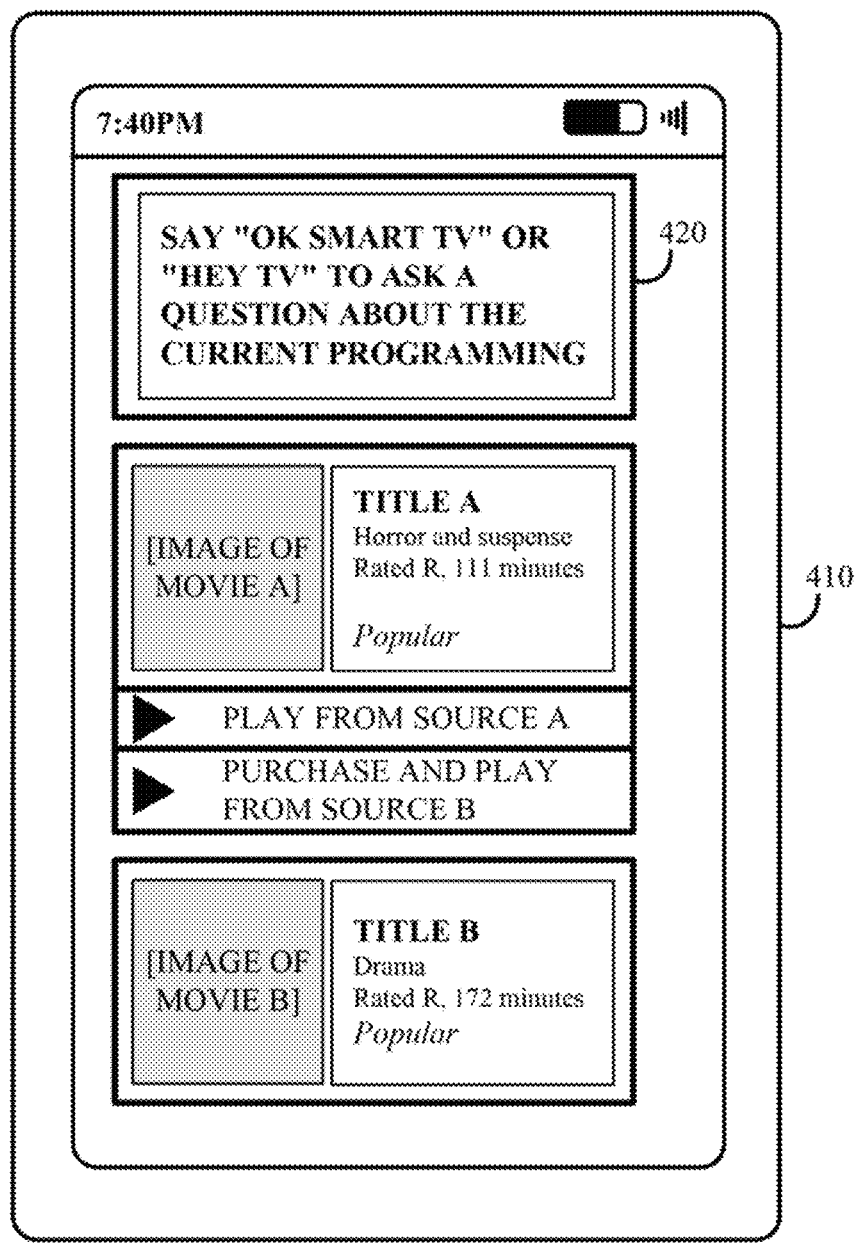
FIGS. 4 and 5 show examples of mobile device interfaces for receiving a query on a mobile device that relates to media content being presented on a media playback device in accordance with some implementations of the disclosed subject matter.

In a more particular example, FIG. 4 shows an illustrative screen that includes an interface that prompts the user with one or more trigger terms or search initiating keywords for initiating a query relating to the presented media content in accordance with some implementations of the disclosed subject matter. As shown, in some implementations, a mobile device 410 can present interface 420 that prompts the user to speak the trigger terms "OK Smart TV" or "Hey TV" to initiate a query relating to the media content being presented on a media playback device. In some implementations, interface 420 can be updated to indicate different trigger terms that can be used to initiate a subsequent search (e.g., a follow-up question by one of the users being presented with the media content).

Referring back to FIG. 3, in some implementations, process 300 can extract the text inputs following the trigger term as the query phrase. For example, in response to receiving one or more trigger terms, process 300 can transmit the remaining audio signal and/or audio data to a speech recognition system, where the speech recognition system converts the query phrase from the audio data into text. Continuing the example above, in response to receiving the trigger term "OK Smart TV," process 300 can present a user interface that states "What's your question?" and, in response to detecting audio data, can transmit the portion of the audio data following the trigger term to a speech recognition system, which extracts the text phrase "how old is this actor?" as the query phrase from the audio data. In some implementations, the query phrase can include text inputs received within a particular time period after the trigger term is received (e.g., ten seconds after receiving the audio trigger term "OK Smart TV"). Alternatively, in some implementations, the query phrase can include text inputs that are received, where the query phrase includes text inputs that have been received continuously (e.g., no more than one second between receiving each text input).

Figure 5:
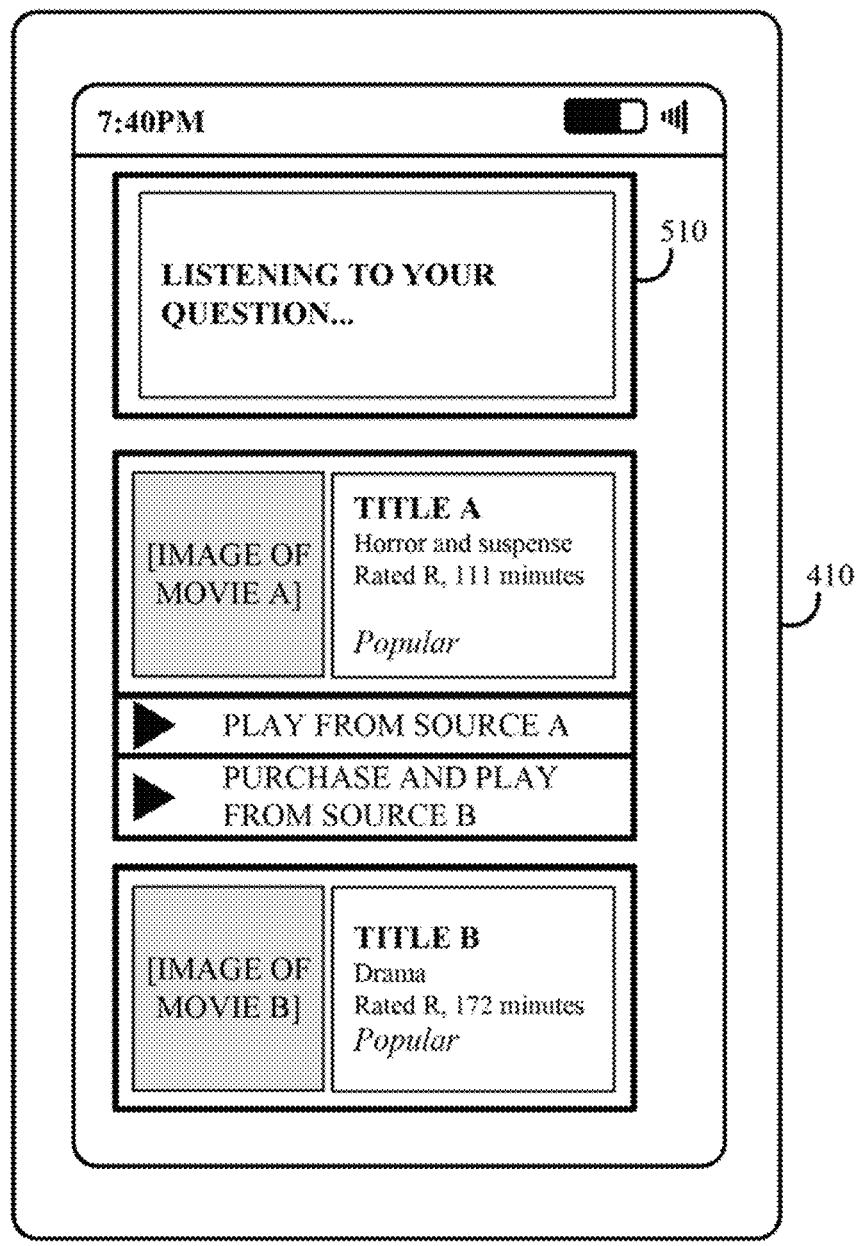
Figure 6:
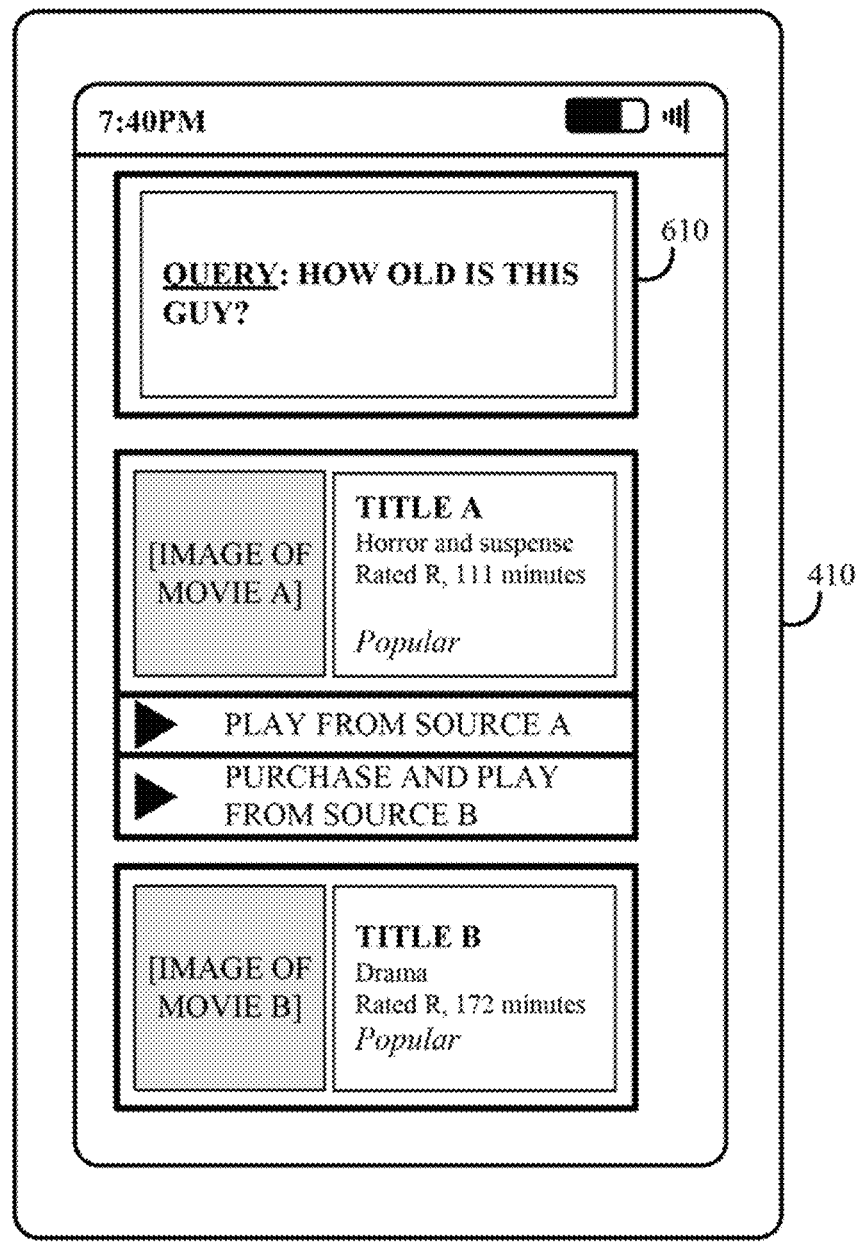
FIGS. 6 and 7 show examples of mobile device interfaces for processing a query relating to media content being presented on a media playback device in accordance with some implementations of the disclosed subject matter.

In a more particular example, FIG. 5 shows an illustrative screen that includes an updated interface indicates that the microphone on the mobile device is capturing an audio signal that includes the query relating to the presented media content in accordance with some implementations of the disclosed subject matter. As shown, in some implementations, mobile device 410 can present interface 510 that indicates the microphone or other audio capturing device associated with mobile device 410 is capturing the audio signal that includes the query relating to the presented media content. In response to receiving the audio signal and processing the audio signal using a speech recognition system, the mobile device can present an interface that includes the text query submitted by the user of mobile device 410. For example, FIG. 6 shows an illustrative interface 610 that is presented on mobile device 410, where interface 610 presents the text query "How old is this guy?"

Referring back to FIG. 3, in some implementations, in response to receiving one or more trigger terms and a query phrase, process 300 can determine media playback information associated with the media content presented during the receipt of the query at 370. For example, in response to receiving one or more trigger terms (e.g., "OK Smart TV") and a query phrase (e.g., "how old is this actor?"), the mobile application executing on the mobile device that received the query can request media playback information corresponding to the received query from the media playback application executing on the media playback device. Media playback information can include, for example, timing information corresponding to when, during the presentation of the media content, the query was received, media content identification information, etc. In a more particular example, the mobile application executing on the mobile device that received the query can receive a beginning timestamp in the media content as to when the trigger term was received, an ending timestamp in the media content as to when the last input in the query was received, and a content identifier of the media content being presented.

At 380, process 300 can continue by causing a search to be performed that includes the query phrase, the timing information, and the media content identification information. For example, the mobile device and/or the media playback device can transmit the received query phrase, the timing information, and the media content identification information to a search server. In turn, the search server can generate a search query based on the received query phrase, the timing information, and the media content identification information and perform a search to obtain search results responsive to the search query. Continuing from the example above, the search server can construct one or more search queries related to the media content based on the received information—e.g., search for metadata associated with media content identified by the media content identification information, search for contextually relevant metadata relating to the media content for a given time period, search a search engine database with the query phrase (e.g., "how old is that actor?") appended to contextually relevant metadata (e.g., actor name, program title, actor popularity, etc.), etc. Once the relevant search query or queries are generated, the search query can be provided to a suitable search engine, which searches one or more repositories and indexes for results responsive to the search query. In some implementations, the search engine can be a general search engine that is accessed by the search module 532 using, for example, a search application programming interface (API). Alternatively, the search engine can be a search engine used exclusively by front-end server 520 or any other component of system 500.

It should be noted that, in some implementations, multiple search results can be returned and popularity information can be used to determine which search result to use in the answer to the submitted query. For example, in some implementations, in response to receiving multiple search results to the query "how old is that actor," popularity information can be used to filter through multiple search results. In another example, in response to receiving multiple search results, confidence information can be used to filter through multiple search results (e.g., if the search result does not have a confidence level of at least 90% of being the answer to the submitted query, the search result is removed from consideration). In this example, upon determining that none of the search results have a confidence level greater than a particular threshold value, an answer to the submitted query may not be presented.

It should also be noted that, in some implementations, an answer can be generated for presentation to the user based on the multiple search results. For example, an answer, such as "Actor A appearing in Television Program B is 45 years old," can be generated in response to reviewing multiple search results. In another example, an answer can be generated from the top search result in the list of search results.

At 390, upon obtaining a search result that is responsive to the submitted query and determining an answer to the submitted query, process 300 can determine how to present the answer to the user or users.

In some implementations, a search result from the search server that is responsive to the query can be presented to the user. For example, in response to receiving the query "how old is that actor," a link to a page responsive to the query can be presented to the user.

In some implementations, an answer that is generated from the search result and that is responsive to the query can be presented to the user. For example, FIG. 7 shows an illustrative interface 710, where the answer "Actor A appearing in Television Program B is 45 years old" followed by a source identifier from the search result is presented in response to receiving the query "how old is this guy." As also shown in FIG. 7, option 720 can be presented that, when selected, can provide the user of mobile device 410 with additional information relating to the presented answer (e.g., a link to the source of the answer, a link to the search results responsive to the query, a page including other questions and/or answers that may be of interest to the user based on the current query, etc.).

In some implementations, the answer or search result responsive to the query can be presented to the user or users using any suitable approach.

Figure 7:
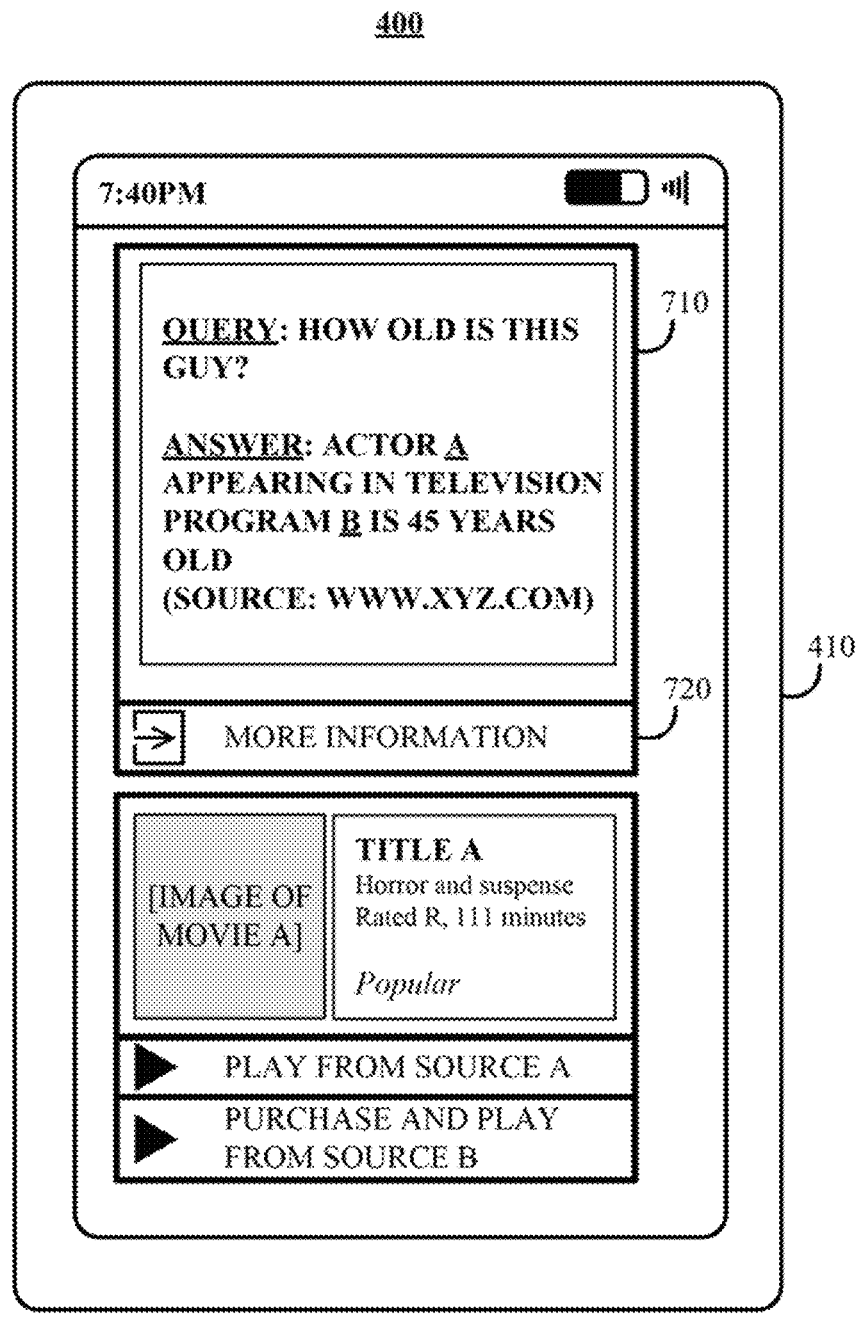

For example, as shown in FIG. 7, the answer is presented in the form of a notification interface on the mobile device. It should be noted that the interface including the answer to the query can be presented on the mobile device that received the audio signal including the query. In some implementations, the interface including the submitted query and the answer to the query can be presented on all of the mobile devices that are currently associated with the media playback device that is presenting the media content.

Referring back to FIG. 3, in some implementations, process 300 can determine which of multiple approaches for delivering the submitted query and the answer to each of the mobile devices associated with the media playback device that is presenting the media content. For example, for mobile devices associated with the media playback device that did not provide the query, an interface can be presented on the mobile application executing on those mobile devices, where the user of the mobile device is presented with the query and the answer in response to launching the mobile application. Continuing with this example, for the mobile device associated with the media playback device that provided the query, a notification that alerts the user of the mobile device and directs the user of the mobile device to the interface that includes the query and answer can be presented.

It should be noted that, in some implementations, the approach for delivering the submitted query and the answer to a mobile device can be determined by user preferences. For example, a user of a mobile device executing the mobile application can indicate a preference that queries and corresponding answers be provided as a notification, provided as an alert, compiled for later viewing, etc. In another example, in response to audio recognition, user authentication, or any other suitable approach for determining the user of the mobile device, user preferences for presenting such answers that are associated with a user account corresponding to the user of the mobile device can be retrieved.

It should also be noted that, in some implementations, the submitted query and the corresponding answer can be presented in a suitable interface to a user of the mobile device that received the audio signal including the query and the user of the mobile device can be provided with the opportunity to share the answer with users of other mobile devices that are connected to the media playback device. For example, in addition to presenting the answer, the interface presented on the mobile device can include an option to selectively share the answer with mobile devices connected to the media playback device (e.g., the user of the mobile device selects one or more mobile devices to receive the submitted query and the corresponding answer, the user of the mobile device shares the submitted query and the corresponding answer to all of the mobile devices connected to the media playback device).

Additionally or alternatively, in some implementations, an interface that includes the submitted query and the corresponding answer can be presented on the media playback device. For example, while the media content is currently being presented, a notification window that does not obstruct the presentation of the media content can be presented that includes the query and the answer. In a more particular example, upon determining the mobile device that provided the query, a notification window that includes the answer to the query can be presented on a side of a window presenting the media content that corresponds to the position of the mobile device (e.g., a notification window on the leftmost portion of a video window presenting the media content in response to determining that the mobile device or audio capturing device that received the query is located on the left portion of the living room environment.

It should be noted that, in some implementations, a user of a mobile device can be provided with the opportunity to share the submitted query and the corresponding answer with users consuming the media content. For example, the interface presented on the mobile device that includes the submitted query and the corresponding answer can also include an option to present the submitted query and the corresponding answer on the media playback device that is presenting the media content.

In some implementations, at least some of the above described blocks of the process of FIG. 3 can be executed or performed in any order or sequence not limited to the order and sequence shown in and described in connection with the figures. Also, some of the above blocks of FIG. 3 can be executed or performed substantially simultaneously where appropriate or in parallel to reduce latency and processing times. Additionally or alternatively, some of the above described blocks of the process of FIG. 3 can be omitted.

In some implementations, the mechanisms described herein can include software, firmware, hardware, or any suitable combination thereof. For example, the mechanisms described herein can encompass a computer program written in a programming language recognizable by one or more of hardware processors 202, 212 and 222 (e.g., a program written in a programming language, such as, Java, C, Objective-C, C++, C#, Javascript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), Java-Server Pages ("JSP"), Active Server Pages ("ASP"), Cold Fusion, or any other suitable approaches).

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for processing queries relating to presented media content presenting content based on user preferences of multiple users in the presence of a media presentation device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method, comprising:
receiving, using a mobile device, a plurality of input terms;
determining whether the plurality of input terms include a query and a trigger term that corresponds to a request to initiate the query relating to media content being presented at a media playback device, the query including at least a portion of the plurality of input terms other than the trigger term;
in response to determining that the trigger term has been included in the plurality of input terms, requesting, using the mobile device, media playback information from the media playback device;
receiving, at the mobile device from the media playback device and in response to the request, the media playback information including media content identification information related to the media content and timing information including a first timestamp corresponding to a first time at which the trigger term was received and a second timestamp corresponding to a second time at which a last term in the query was received;
in response to receiving the media playback information the mobile device enabled to cause a search to be performed at a search server that includes the query, the timing information, and the media content identification information; and
receiving and presenting, on a display of the mobile device, at least a portion of a search result responsive to the search, including the query.

2. The method of claim 1, wherein the at least the portion of the search result is determined to be presented on the display of the mobile device based on search popularity information associated with the search result.

3. The method of claim 1, further comprising:
retrieving the media playback information prior to receiving the query; and
associating the media playback information with the query in response to receiving the trigger term.

4. The method of claim 1, further comprising:
receiving a request to associate with the media playback device, wherein the media playback device is presenting the media content and wherein the media playback device is executing a media application that exchanges the media playback information with a mobile application executing on the mobile device;

associating the mobile device with the media playback device; and activating an audio input device associated with the mobile device to receive a plurality of ambient sounds in response to associating with the media playback device, wherein the plurality of ambient sounds are converted to the plurality of input terms.

5. The method of claim 4, further comprising:

determining whether the audio input device associated with the mobile device is capable of receiving the plurality of ambient sounds; and activating an audio capturing device associated with the media playback device in response to determining that the audio input device associated with the mobile device is not capable of receiving the plurality of ambient sounds.

6. The method of claim 4, further comprising extracting the trigger term and the query from the plurality of input terms comprises processing the plurality of ambient sounds using a speech recognition system.

7. The method of claim 4, further comprising:

requesting additional media playback information from the media application executing on the media playback device; and transmitting the query, the media playback information, and the additional media playback information to a search system to receive the search result.

8. The method of claim 4, further comprising:

determining whether the search result is to be presented on the display of the mobile device; and presenting at least a second portion of the search result on a display associated with the media playback device in response to determining that the at least the second portion of the search result is not to be presented on the display of the mobile device.

9. The method of claim 4, further comprising:

receiving requests from a plurality of mobile devices to associate with the media playback device that is presenting the media content;

activating audio capturing devices associated with at least a portion of the plurality of mobile devices and the media playback device to receive the plurality of ambient sounds from users proximate to the plurality of mobile devices and the media playback device;

determining that a plurality of queries have been received based on the plurality of ambient sounds, wherein each of the plurality of queries includes the trigger term and the query relating to the presented media content;

obtaining a plurality of search results, wherein each of the plurality of search results is responsive to one of the plurality of queries; and causing the plurality of search results to be presented.

10. The method of claim 9, further comprising:

associating at least one search result of the plurality of search results with a respective mobile device from which the plurality of ambient sounds including the query was received; and causing the at least the portion of the search result to be presented on the respective mobile device.

11. A system, comprising:

a hardware processor of a mobile device configured to:

receive a plurality of input terms;

determine whether the plurality of input terms include a query and a trigger term that corresponds to a request to initiate the query relating to media content being presented at a media playback device, the query including at least a portion of the plurality of input terms other than the trigger term;

in response to determining that the trigger term has been included in the plurality of input terms, requesting, using the mobile device, media playback information from the media playback device;

receive, at the mobile device from the media playback device and in response to the request, the media playback information including media content identification information related to the media content and timing information including a first timestamp corresponding to a first time at which the trigger term was received and a second timestamp corresponding to a second time at which a last term in the query was received;

cause, using the mobile device, a search to be performed at a search server that includes the query, the timing information, and the media content identification information; and receive and present, on a display of the device, at least a portion of a search result responsive to the search, including the query.

12. The system of claim 11, wherein the at least the portion of the search result is determined to be presented on the display of the mobile device based on search popularity information associated with the search result.

13. The system of claim 11, wherein the hardware processor is further configured to:

retrieve the media playback information prior to receiving the query; and associate the media playback information with the query in response to receiving the trigger term.

14. The system of claim 11, wherein the hardware processor is further configured to:

receive a request to associate with the media playback device, wherein the media playback device is presenting the media content and wherein the media playback device is executing a media application that exchanges the media playback information with a mobile application executing on the mobile device;

associate the mobile device with the media playback device; and activate an audio input device associated with the mobile device to receive a plurality of ambient sounds in response to associating with the media playback device, wherein the plurality of ambient sounds are converted to the plurality of input terms.

15. The system of claim 14, wherein the hardware processor is further configured to:

determine whether the audio input device associated with the mobile device is capable of receiving the plurality of ambient sounds; and activate an audio capturing device associated with the media playback device in response to determining that the audio input device associated with the mobile device is not capable of receiving the plurality of ambient sounds.

16. The system of claim 14, wherein the hardware processor is further configured to extract the trigger term and the query from the plurality of input terms comprises processing the plurality of ambient sounds using a speech recognition system.

17. The system of claim 14, wherein the hardware processor is further configured to:

request additional media playback information from the media application executing on the media playback device; and transmit the query, the media playback information, and the additional media playback information to a search system to receive the search result.

18. The system of claim 14, wherein the hardware processor is further configured to:

determine whether the search result is to be presented on the display of the mobile device; and present at least a second portion of the search result on a display associated with the media playback device in response to determining that the at least the second portion of the search result is not to be presented on the display of the mobile device.

19. The system of claim 11, wherein the hardware processor is further configured to:

receive requests from a plurality of mobile devices to associate with the media playback device that is presenting the media content;

activate audio capturing devices associated with at least a portion of the plurality of mobile devices and the media playback device to receive a plurality of ambient sounds from users proximate to the plurality of mobile devices and the media playback device;

determine that a plurality of queries have been received based on the plurality of ambient sounds, wherein each of the plurality of queries includes the trigger term and the query relating to the presented media content;

obtain a plurality of search results, wherein each of the plurality of search results is responsive to one of the plurality of queries; and cause the plurality of search results to be presented.

20. The system of claim 19, wherein the hardware processor is further configured to:

associate at least one search result of the plurality of search results with a respective mobile device from which the plurality of ambient sounds including the query was received; and cause at least the portion of the search result to be presented on the respective mobile device.

21. A non-transitory computer-readable medium containing computer executable instructions that, when executed by a processor, cause the processor to perform method for providing media guidance, the method comprising:

receiving, using a mobile device, a plurality of input terms;

determining whether the plurality of input terms include a query and a trigger term that corresponds to a request to initiate the query relating to media content being presented at a media playback device;

in response to determining that the trigger term has been included in the plurality of input terms, requesting, using the mobile device, media playback information from the media playback device;

receiving, at the mobile device from the media playback device and in response to the request, the media playback information including media content identification information related to the media content and timing information including a first timestamp corresponding to a first time at which the trigger term was received and a second timestamp corresponding to a second time at which a last term in the query was received;

causing, using the mobile device, a search to be performed at a search server that includes the query, the timing information, and the media content identification information, the query including at least a portion of the plurality of input terms other than the trigger term; and receiving and presenting, on a display associated with the mobile device, at least a portion of a search result responsive to the search, including the query.

* * * * *